United States Patent
Martin (10) Patent No.: US 12,326,208 B2
(45) Date of Patent: Jun. 10, 2025

(54) RATCHETING CABLE CLAMP

(71) Applicant: Hubbell Incorporated, Shelton, CT (US)

(72) Inventor: Evan Martin, Litchfield, NH (US)

(73) Assignee: HUBBELL INCORPORATED, Shelton, CT (US)

( * ) Notice: Subject to any disclaimer, the term of this patent is extended or adjusted under 35 U.S.C. 154(b) by 0 days.

(21) Appl. No.: 18/117,563

(22) Filed: Mar. 6, 2023

(65) Prior Publication Data
US 2023/0279970 A1    Sep. 7, 2023

Related U.S. Application Data

(60) Provisional application No. 63/317,266, filed on Mar. 7, 2022.

(51) Int. Cl.
  *F16L 3/10* (2006.01)
  *F16L 33/035* (2006.01)

(52) U.S. Cl.
  CPC ........... *F16L 3/1075* (2013.01); *F16L 3/1025* (2013.01); *Y10T 24/1482* (2015.01)

(58) Field of Classification Search
  CPC ............. Y10T 24/1498; Y10T 24/1482; Y10T 24/141; Y10T 24/14; F16L 37/1225; F16L 37/1025; F16L 37/1075
  See application file for complete search history.

(56) References Cited

U.S. PATENT DOCUMENTS

| | | | | |
|---|---|---|---|---|
| 973,532 | A * | 10/1910 | McLaughlin | F16L 3/10 24/20 TT |
| 4,372,011 | A * | 2/1983 | Aranyos | F16L 33/035 24/16 PB |
| 4,502,186 | A * | 3/1985 | Clarke | F16L 33/035 24/16 PB |
| 4,557,024 | A * | 12/1985 | Roberts | F16L 33/035 24/23 EE |
| 5,687,455 | A * | 11/1997 | Alexander | B65D 63/1072 24/593.11 |
| 5,937,488 | A | 8/1999 | Geiger | |
| 8,328,457 | B2 * | 12/2012 | Werth | A61M 39/1011 403/313 |

(Continued)

FOREIGN PATENT DOCUMENTS

EP    2141397 A1    1/2010

OTHER PUBLICATIONS

Ratched P-Clamp, Rugged Bundle Management for Heavy Duty Applications, HellermannTyton Brochure, HellermannTyton Corporation, Feb. 2020, Rev6, pp. 1-58.

(Continued)

*Primary Examiner* — Jason W San
*Assistant Examiner* — Michael S Lee
(74) *Attorney, Agent, or Firm* — Dilworth IP, LLC (57) ABSTRACT

A clamp including a body having a top portion hinged to a bottom portion, each of the top portion and the bottom portion including a rounded inner surface for receiving an elongated element, a ratchet on the top portion having a plurality of teeth, an opening in the bottom portion for removably receiving the ratchet, and a retaining assembly for adjustably engaging a portion of the plurality of teeth in the opening, the retaining assembly being releasable without tools.

12 Claims, 6 Drawing Sheets

(56) References Cited

U.S. PATENT DOCUMENTS

| | | | |
|---|---|---|---|
| 8,398,424 B1* | 3/2013 | Vasavda | H01R 13/639 |
| | | | 439/371 |
| 10,119,631 B2 | 11/2018 | Toll et al. | |
| 10,903,632 B2 | 1/2021 | Toll et al. | |
| 11,054,063 B2 | 7/2021 | Ratzlaff et al. | |
| 11,359,751 B2* | 6/2022 | White | F16L 37/1225 |
| 2009/0119886 A1* | 5/2009 | Werth | F16L 23/04 |
| | | | 24/193 |
| 2009/0208277 A1* | 8/2009 | Werth | F16L 23/04 |
| | | | 403/312 |
| 2017/0227141 A1 | 8/2017 | Toll et al. | |
| 2019/0036314 A1 | 1/2019 | Toll et al. | |
| 2019/0185234 A1* | 6/2019 | Abrahams | B65D 63/1081 |
| 2020/0080675 A1 | 3/2020 | White | |

OTHER PUBLICATIONS

International Search Report and Written Opinion issued in App. No. PCT/US2023/014573, mailing date May 25, 2023, 14 pages.

* cited by examiner

RATCHETING CABLE CLAMP

FIELD OF THE INVENTION

The present disclosure relates to clamps, and more particularly, to cable clamps or clips with ratcheting mechanisms.

BACKGROUND

Cable clamps are widely used to secure cables and wires in cable systems. Cable clamps are available in numerous different styles and sizes. While some are adjustable to accommodate different cable and wire sizes, the range of adjustment is often limited. In large cable systems, such as large-scale solar installations, the cables are required to be secured at regular intervals, and the size and number of cables can vary from one location to the next. Cable installers often struggle to properly manage all of the required cables and often require a plurality of different cable clamps.

Furthermore, existing cable clamps either cannot be reopened or require tools to do so. This makes adjusting or replacing a cable clamp difficult and time consuming. For example, cable ties generally must be cut to open. Most p-clips are closed with fasteners requiring tools to open.

U.S. Pat. No. 10,119,631 describes an adjustable p-clamp assembly and method to secure elongated items such as wires, cables, and the like. The assembly is closed with a tongue member, having serrations along a width of the tongue, that engages into a slot. A wedge-shaped pawl with teeth engages the serrations. In order to open the assembly, an elongate release tool must be inserted to disengage the teeth from the serrations.

U.S. Pat. No. 11,054,063 describes a clamping device with a clamp frame that is configured to move between an open configuration and a closed configuration to wrap around and hold a longitudinal element. The clamping device includes a locking mechanism including a fastener to secure a coupling end to a coupling base. Though some embodiments may be used without a tool, the clamping device is not adjustable.

There is a need for improved clamps for cables and other elongated elements. The present invention solves these and other problems in the prior art.

SUMMARY

An object of the present invention is to provide a clamp that accommodates a variety of sizes of elongated elements, such as cables, and that is easy to open, operate, and/or reuse. A further object is to provide a clamp that is adjustable and openable by hand without the need for tools.

In one exemplary embodiment according to the present disclosure, a P-clip style device is provided that uses a ratcheting mechanism to secure elongated elements, such as cables, of various sizes. The ratcheting mechanism can be manually released without the use of tools to aid with adding or removing wires. The device may have a large robust design with adjustment for various sized cables and/or bundles of cables.

In one exemplary embodiment according to the present disclosure, a clamp is provided including a body having a top portion hinged to a bottom portion, each of the top portion and the bottom portion including a rounded inner surface for receiving an elongated element, a ratchet on the top portion having a plurality of teeth, an opening in the bottom portion for removably receiving the ratchet, and a retaining assembly for adjustably engaging a portion of the plurality of teeth in the opening, the retaining assembly being releasable without tools. In some embodiments, the ratchet includes a first plurality of teeth on a first side of the ratchet and a second plurality of teeth on a second side of the ratchet opposite the first side of the ratchet.

In some embodiments, the retaining assembly includes a first retainer on a first side of the bottom portion and a second retainer on a second side of the bottom portion opposite the first side of the bottom portion. Each of the first and second retainers may include a pawl extending into an interior of the bottom portion, the pawl being selectively disengaged by manipulating the respective first or second retainer. Each of the first and second retainers may further include a button and a center portion, the pawl and the button being at least partially rotatable about the center portion.

In some embodiments, the retaining assembly includes a first retainer on a first side of the bottom portion and a second retainer on a second side of the bottom portion opposite the first side of the bottom portion, wherein each of the first and second retainers includes a pawl extending into an interior of the bottom portion, a center portion, and a button, the pawl and the button being rotatable about the center portion, and the pawl being selectively disengaged by pressing the button of the respective first or second retainer. In some embodiments, the ratchet is released from the retaining assembly only when the buttons of both of the first and second retainers are pressed.

The ratchet may be formed integrally with the top portion. In some embodiments, the rounded inner surfaces of the top portion and the bottom portion include ribs. In some embodiments, the bottom portion includes an attachment portion with at least one hole configured to receive a fastener. The attachment portion may be formed integrally with the bottom portion. In some embodiments, the clamp includes a living hinge between the top portion and the bottom portion of the body.

Further provided is a clamp including a body having a top portion hinged to a bottom portion, each of the top portion and the bottom portion including an inner surface being rounded for receiving an elongated element, a ratchet formed integrally with the top portion and having a first plurality of teeth on a first edge and a second plurality of teeth on a second edge opposite the first edge, an opening in the bottom portion for removably receiving the ratchet, and a retaining assembly for adjustably engaging the ratchet in the opening including a first retainer having a pawl configured to removably engage the first plurality of teeth and a second retainer having a pawl configured to removably engage the second plurality of teeth, the retaining assembly being releasable without tools.

In some embodiments, each of the first and second retainers further includes a center portion and a button, the pawl and the button being rotatable about the center portion, and the pawl being selectively disengaged by pressing the button of the respective first or second retainer. In some embodiments, the ratchet is released from the retaining assembly only when the buttons of both of the first and second retainers are pressed. The bottom portion may include an attachment portion with at least one hole configured to receive a fastener, wherein the attachment portion is formed integrally with the bottom portion.

Further provided is a method of clamping an elongated element, including steps of engaging a clamp around the elongated element, the clamp including a body with a top portion hinged to a bottom portion, each of the top portion and the bottom portion including a rounded inner surface, the clamp further including a ratchet on the top portion, an opening in the bottom portion for removably receiving the ratchet, and a retaining assembly, at least partially closing the top portion of the clamp toward the elongated element, and inserting the ratchet into the opening until the rounded inner surfaces of the top portion and the bottom portion are secured against the elongated element, wherein the ratchet has a plurality of teeth and the retaining assembly engages a portion of the plurality of teeth in the opening, the ratchet being releasable from the retaining assembly without tools.

The retaining assembly may include a first retainer having a pawl configured to removably engage at least one of the plurality teeth on a first edge of the ratchet and a second retainer having a pawl configured to removably engage at least one of the plurality teeth on a second edge of the ratchet opposite the first edge. In some embodiments, the method further includes releasing the ratchet from retaining assembly by simultaneously pressing each of the first and second retainers to release the respective pawls.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions, or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

Figure 1:
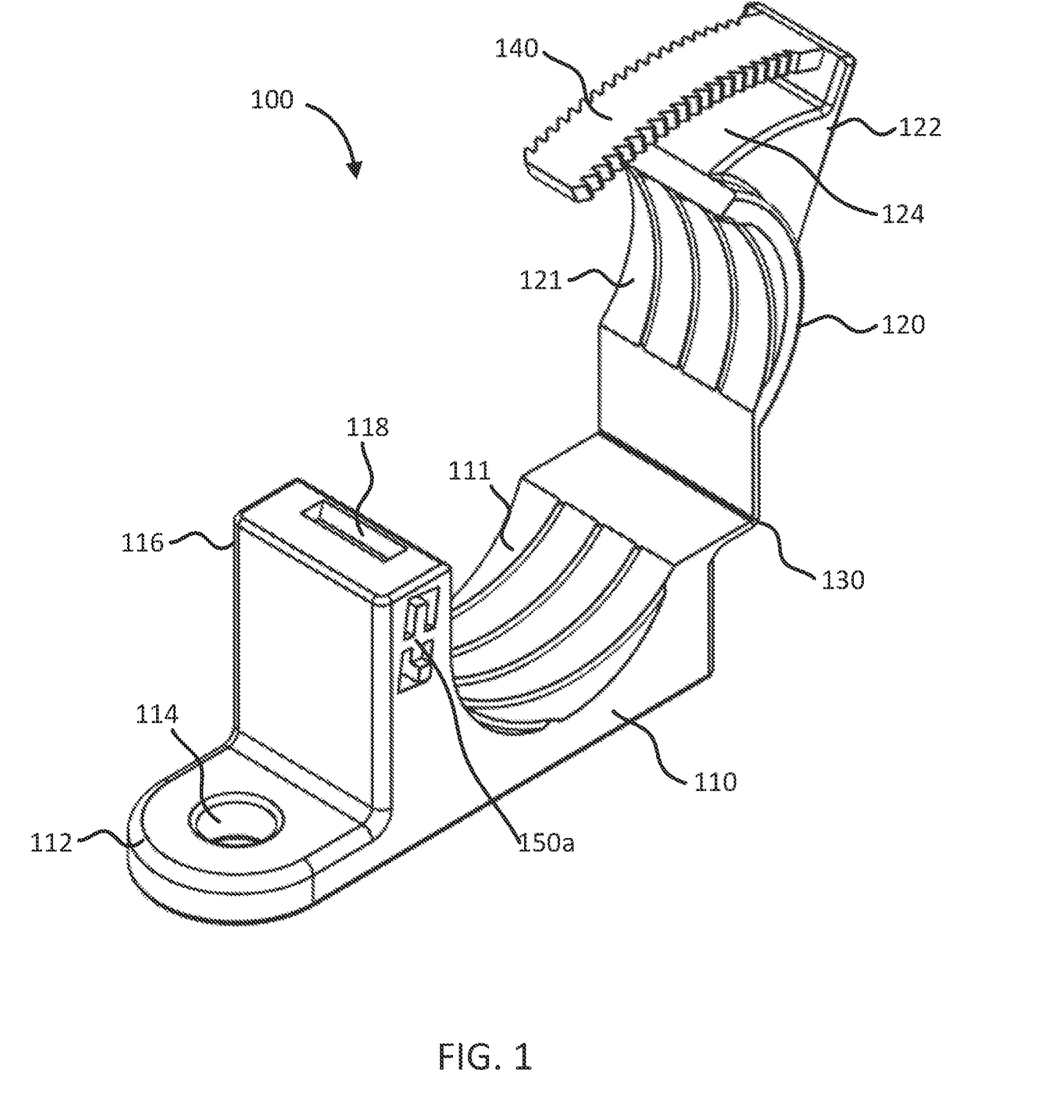
FIG. 1 is an isometric view of a clamp according to an exemplary embodiment of the present disclosure in an open configuration.
Figure 2:
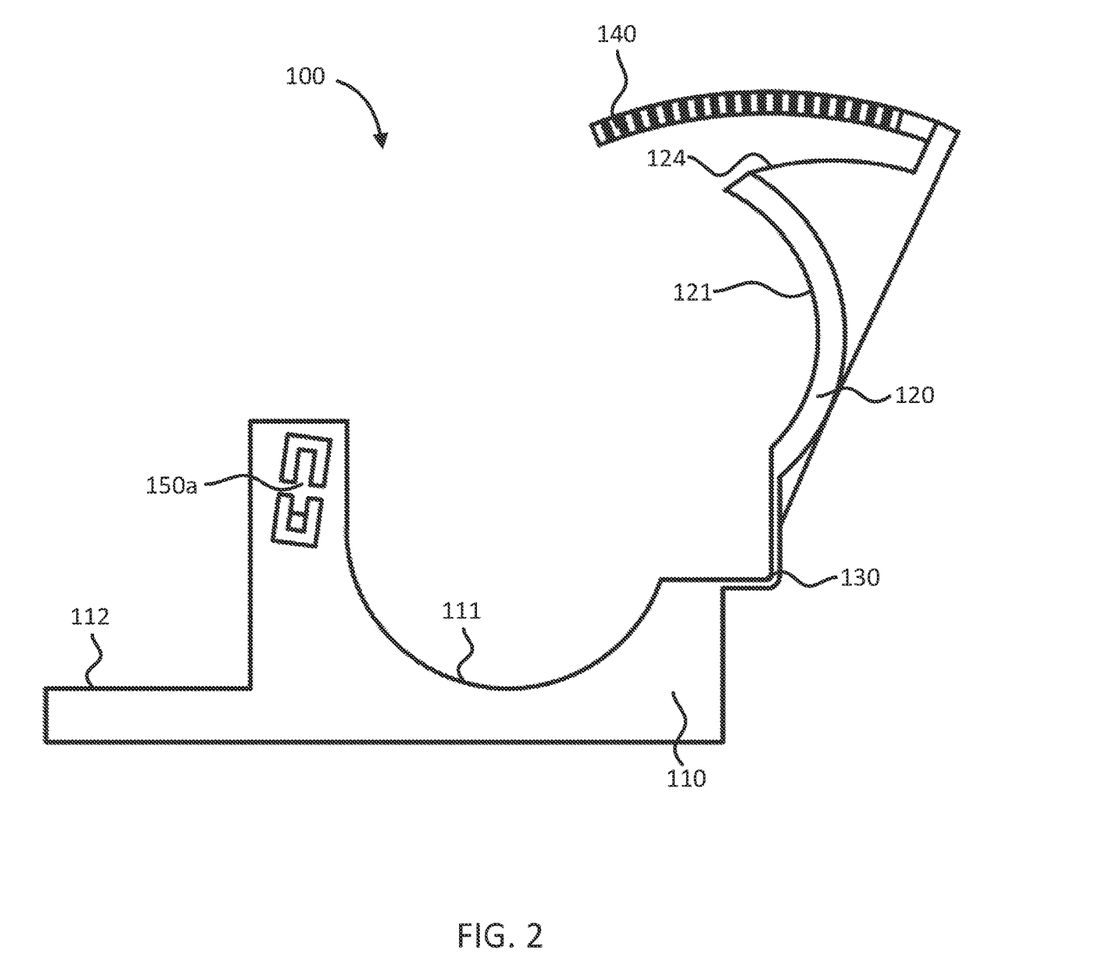
FIG. 2 is a side view of the clamp shown in FIG. 1.
Figure 3:
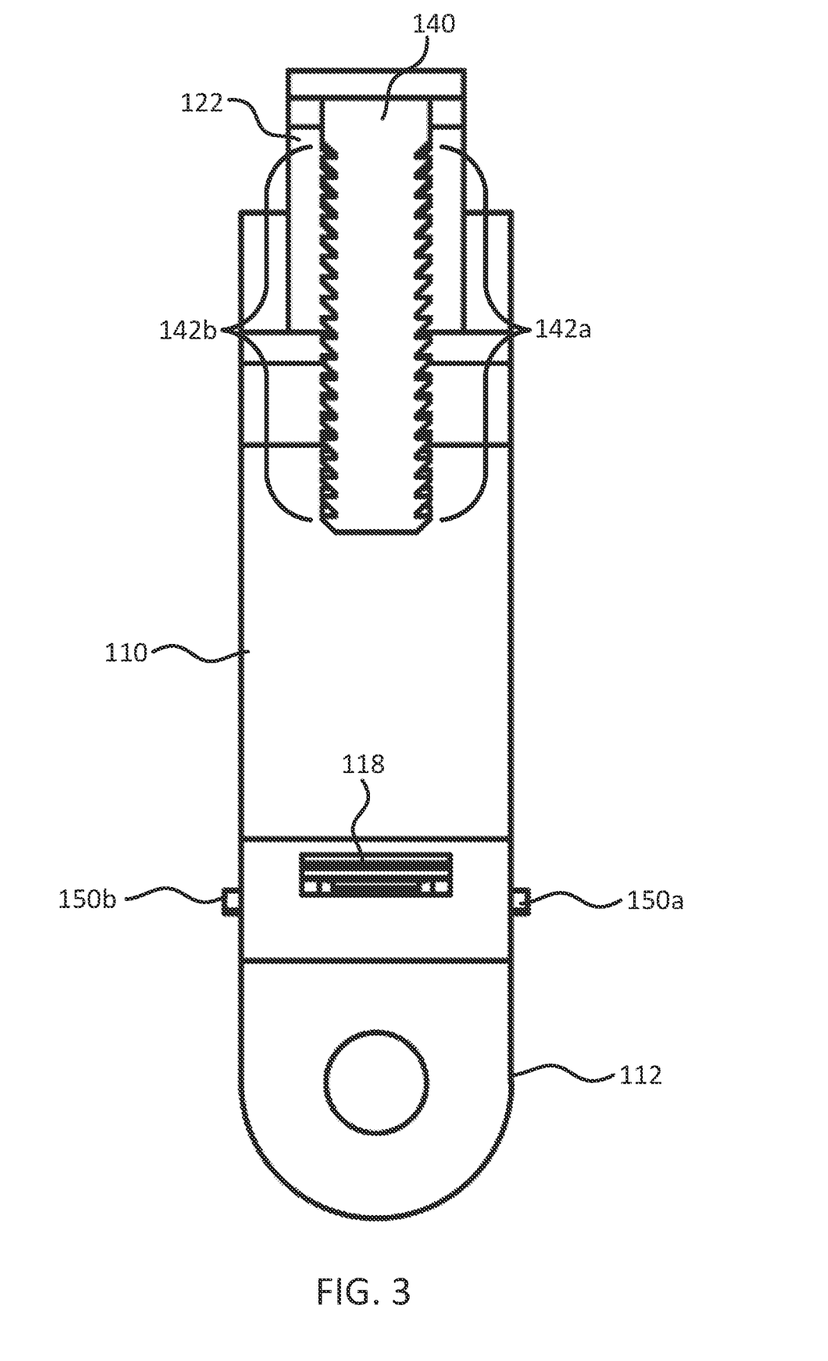
FIG. 3 is a top view of the clamp shown in FIG. 1.

FIGS. 1-3 show a clamp 100 according to exemplary embodiment of the present disclosure in an open configuration. The clamp 100 includes a body having a bottom portion 110 hinged to a top portion 120 and operable between the open configuration and at least one closed configuration. As noted above, references to "top" and "bottom" are only for illustrated purposes are not intended to limit the orientation in which the clamp 100 may be used. A hinge 130 is positioned between and/or formed integrally with the bottom portion 110 and the top portion 120. The hinge 130 may be, for example, a living hinge though it is not limited thereto.

The bottom portion 110 includes an inner surface 111 that is at least partially rounded for receiving a cable or other elongated element such as tubing or the like. The top portion 120 includes a corresponding inner surface 121 being rounded for receiving the cable or other elongated element such as tubing or the like. The inner surfaces 111,121 may have ribs or other protrusions to assist with securing the clamp 100 to the elongated element.

The bottom portion 110 includes an attachment portion 112 which may include at least one hole 114 for receiving a fastener. In the exemplary embodiment, the attachment portion 112 is formed integrally with the bottom portion 110. The bottom portion 110 also includes a housing 116. In the exemplary embodiment, the housing 116 extends upward from and substantially perpendicular to the bottom portion 110. The housing has an opening 118 on its distal end for removably retaining a ratchet 140 at an adjustable position when the clamp 100 is in a closed or partially closed configuration. The housing 116 also includes a retaining assembly comprised of a first retainer 150a and/or a second retainer 150b which engage with teeth on the ratchet 140.

The ratchet 140 may be formed integrally with the top portion 120. In other embodiments, the ratchet 140 may be formed separately and attached to the top portion 120. The top portion 120 has a distal end 122 where the ratchet 140 is formed or attached. The distal end 122 may also have an outer surface 124 inboard of and opposite to the ratchet 140. The outer surface 124 may nest within the inner surface 111 of the bottom portion 110 when the clamp 100 is in some closed configurations.

As shown in FIG. 3, the ratchet 140 includes a plurality of teeth 142a on a first side and/or a plurality of teeth 142b on a second side, the second side being opposite the first side such that the pluralities of teeth 142a,142b are projecting substantially opposite to one another. By having a plurality of teeth 142,142b, the ratchet 140 may be adjustably positioned in the opening 118 at any one of a range of positions. The first retainer 150a is positioned and configured to engage one or more of the plurality of teeth 142a and the second retainer 150b is positioned and configured to engage one or more of the plurality of teeth 142b.

Figure 4:
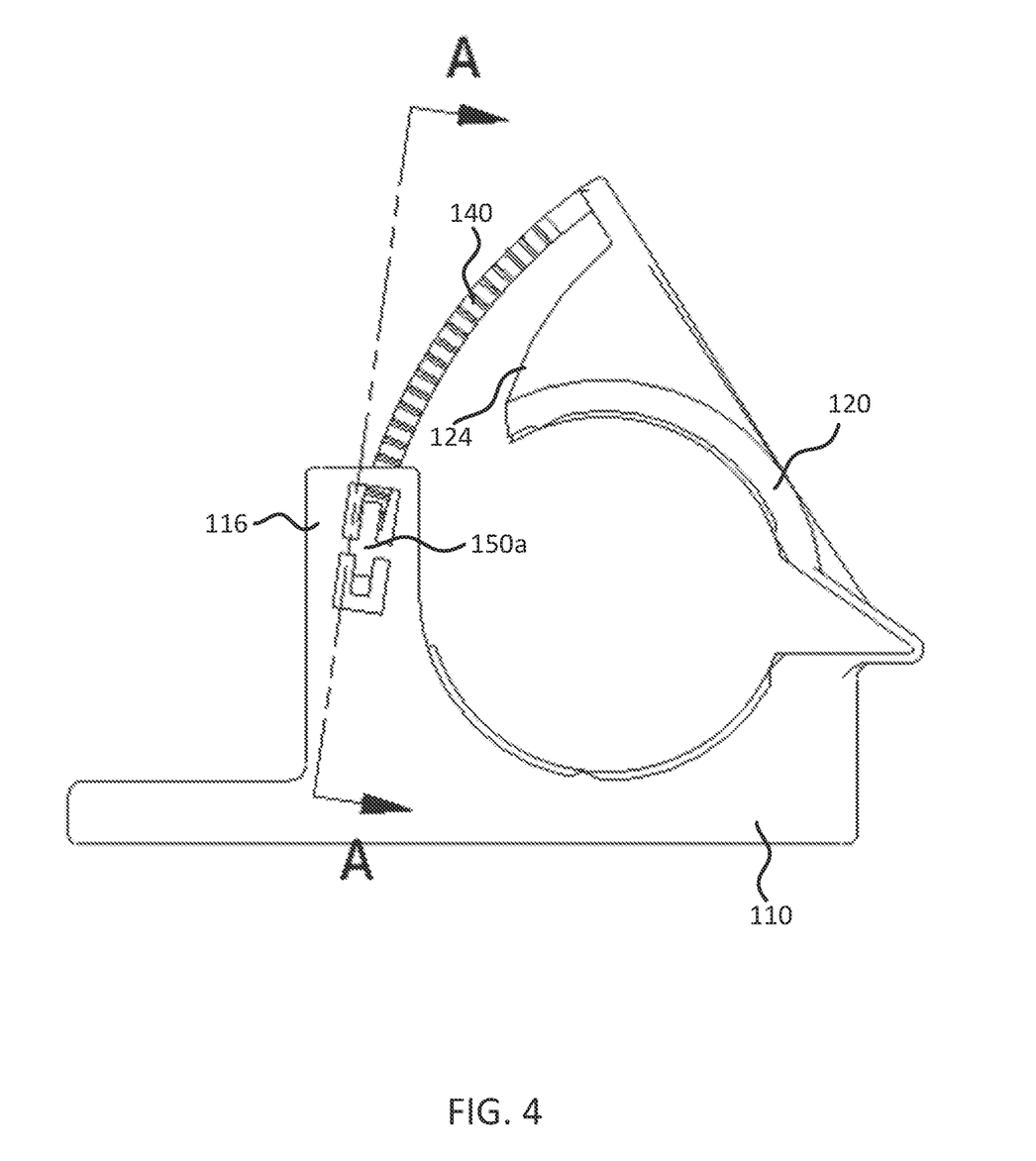
FIG. 4 is a side view of a clamp according to an exemplary embodiment of the present disclosure in a partially closed configuration.

FIG. 4 is a side view of a clamp 100 according to an exemplary embodiment of the present disclosure in a partially closed configuration. The ratchet 140 is shown being removably received in the opening 118. The ratchet 140 can be retained by the retainers 150a and/or 150b in a plurality of positions to accommodate a variety of cable sizes. The retainers 150a and 150b can advantageously be engaged and released by hand without tools.

Figure 5:
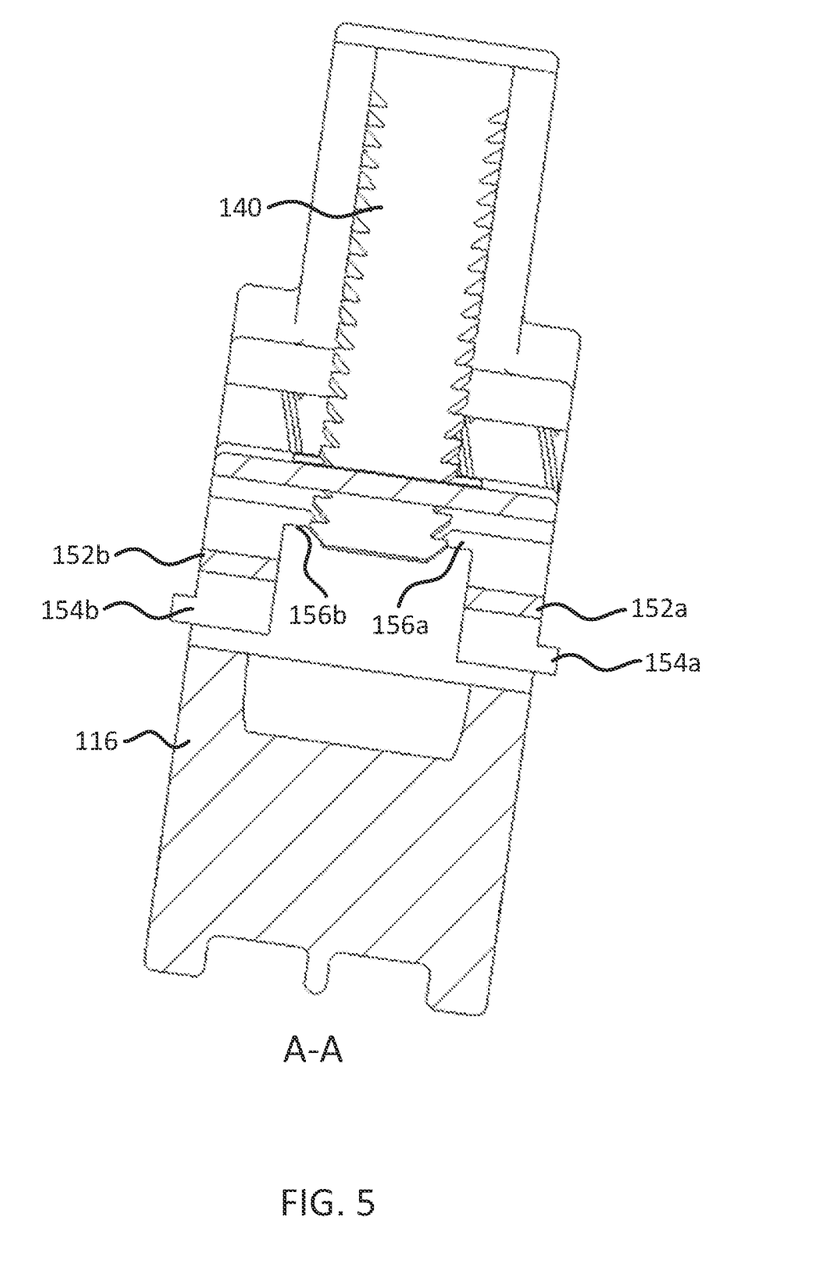
FIG. 5 is a sectional view of the clamp shown in FIG. 4.

FIG. 5 is a sectional view A-A of the clamp 100 shown in FIG. 4. In the exemplary embodiment, each of the retainers 150a,150b have a central portion 152a,152b. Each central portion 152a,152b is attached to or formed integrally with a respective side wall of the housing 116. Each retainer 150a,150b also includes a button 154a,154b and a pawl 156a,156b on opposite sides of the respective central portion 152a,152b. By pressing the buttons 154a,154b and/or squeezing the buttons 154a,154b together (e.g., simultaneously), each of the retainers 150a,150b rotates or flexes about its respective central portion 152a,152b. In one exemplary embodiment, the buttons 154a,154b must both be pressed to release the ratchet 140 which acts as a safety mechanism to prevent an inadvertent release. Rotation of the retainers 150a,150b in turn retracts the pawls 156a,156b from the teeth on the first and second sides of the ratchet 140 and releases the ratchet 140.

Figure 6:
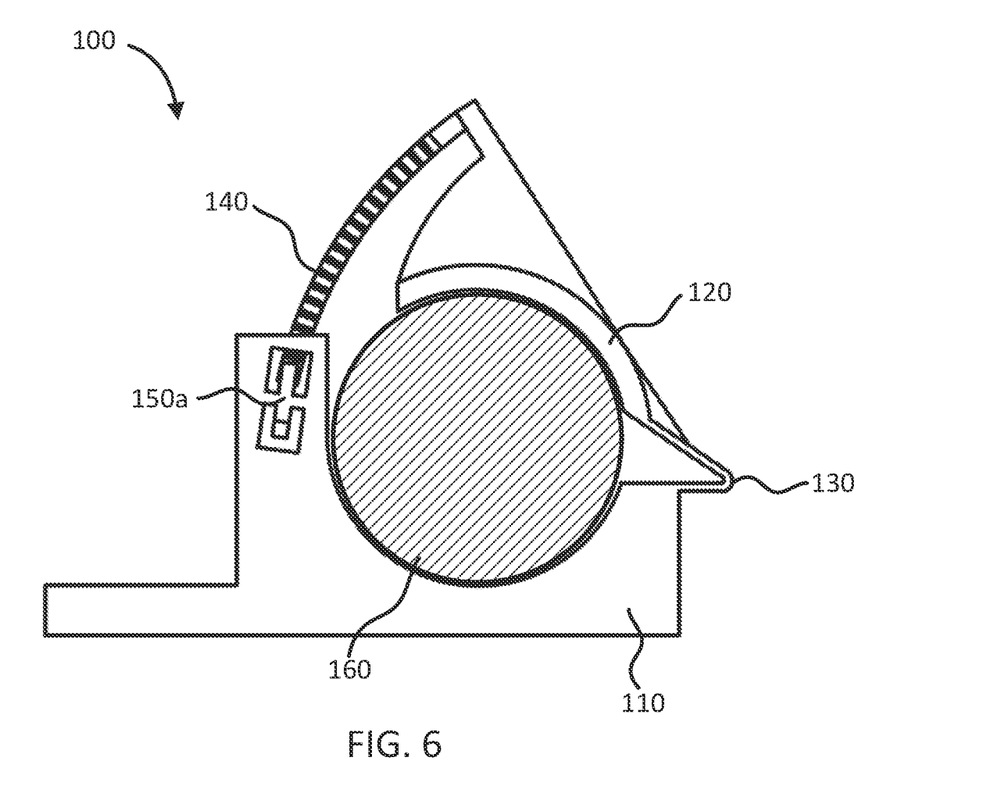
FIG. 6 is a side view of a clamp according to an exemplary embodiment of the present disclosure in a closed configuration about a cable.
Figure 7:
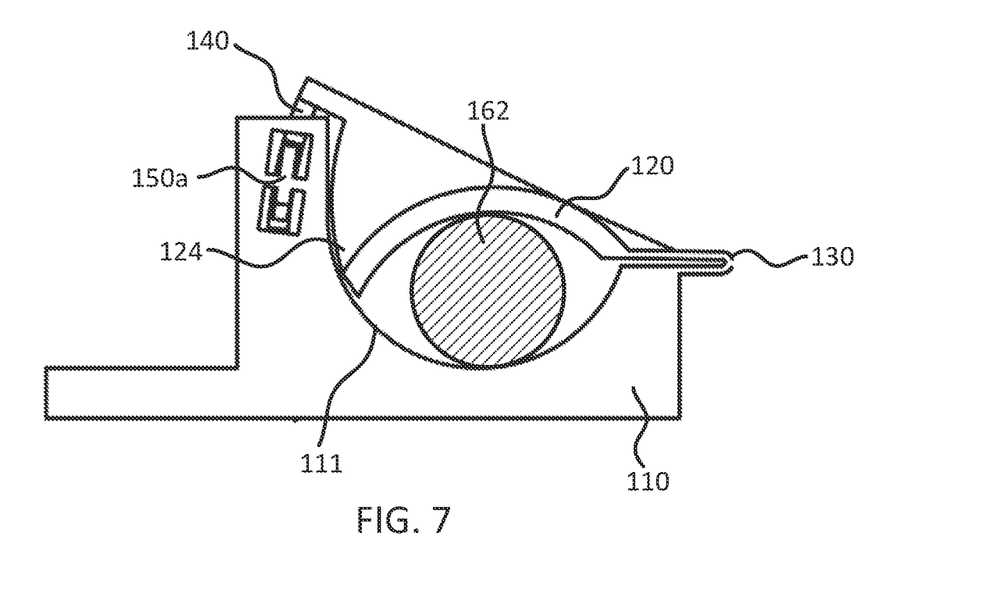
FIG. 7 is a side view of a clamp according to an exemplary embodiment of the present disclosure in a closed configuration about a cable.

FIG. 6 is a side view of a clamp 100 according to an exemplary embodiment of the present disclosure in a first closed configuration about a cable 160. FIG. 7 is a side view of a clamp 100 according to an exemplary embodiment of the present disclosure in a second closed configuration about a cable 162. As FIGS. 6-7 illustrate, the ratchet 140 may be adjustably positioned in the opening 118 at any one of a range of positions. When a large cable is being clamped, such as the cable 160 having a diameter of approximately 1.5 inches, the clamp 100 may be partially open with a distal end of the ratchet 140 retained by the retaining assembly. When a small cable is being clamped, such as the cable 162 having a diameter of approximately 0.75 inches, the clamp 100 may be closed with the outer surface 124 against or adjacent to the inner surface 111 of the bottom portion 110. Different sized clamps 100 may be provided to accommodate larger cables such as 3 inches in diameter or and/or smaller cables such as 0.5 inches or less.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A clamp, comprising:
 a bottom body portion including a first rounded inner surface for receiving an elongated element;
 a top body portion, hinged to the bottom body portion, including a second rounded inner surface for receiving the elongated element, a top surface, and a rounded end surface extending between the top surface and a distal end of the second rounded inner surface, wherein the rounded end surface is configured to nest within the first rounded inner surface, wherein a distance between the top surface and the second rounded inner surface is largest at the distal end of the second rounded inner surface;
 a protrusion extending from the top body portion where the top surface meets the rounded end surface;
 a ratchet extending from the protrusion having a plurality of teeth, the ratchet extending adjacent to the rounded end surface and beyond the distal end of the second rounded inner surface;
 an opening in the bottom body portion for removably receiving the ratchet; and
 a retaining assembly for adjustably engaging a portion of the plurality of teeth in the opening, the retaining assembly being releasable without tools,
 wherein the retaining assembly includes a first retainer on a first side of the bottom body portion and a second retainer on a second side of the bottom body portion opposite the first side of the bottom body portion, each of the first and second retainers including a pawl extending into an interior of the bottom body portion, a button, and a center portion fixed in the bottom body portion and positioned vertically between the pawl and the button, the pawl and the button being rotatable about the center portion, the pawl of a respective first or second retainer being selectively disengaged by pressing the button of the respective first or second retainer inward at least partially into the interior causing the pawl to at least partially retract from the interior, and
 wherein each of the first and second retainers is formed integrally with the bottom body portion.

2. The clamp of claim 1, wherein the ratchet includes a first plurality of teeth on a first side of the ratchet and a second plurality of teeth on a second side of the ratchet opposite the first side of the ratchet.

3. The clamp of claim 1, wherein the ratchet is released from the retaining assembly only when the buttons of both of the first and second retainers are pressed.

4. The clamp of claim 1, wherein the ratchet is formed integrally with the top body portion.

5. The clamp of claim 1, wherein the elongated element is a cable or a tube.

6. The clamp of claim 1, wherein the first and second rounded inner surfaces of the top body portion and the bottom body portion include ribs.

7. The clamp of claim 1, wherein the bottom body portion includes an attachment portion with at least one hole configured to receive a fastener.

8. The clamp of claim 7, wherein the attachment portion is formed integrally with the bottom body portion.

9. The clamp of claim 1, further comprising a living hinge between the top body portion and the bottom body portion.

10. The clamp of claim 1, wherein the top surface is a flat top surface.

11. A method of clamping an elongated element, comprising steps of:
 engaging a clamp around the elongated element, the clamp including a bottom body portion including a first rounded inner surface, a top body portion hinged to the bottom body portion the top body portion including a second rounded inner surface, a top surface, and a rounded end surface extending between the top surface and a distal end of the second rounded inner surface, wherein the rounded end surface is configured to nest within the first rounded inner surface, wherein a distance between the top surface and the second rounded inner surface is largest at the distal end of the second rounded inner surface, the clamp further including a protrusion extending from the top bottom portion where the top surface meets the rounded end surface, a ratchet extending from the protrusion adjacent to the rounded end surface and beyond the distal end of the second rounded inner surface, an opening in the bottom body portion for removably receiving the ratchet, and a retaining assembly;
 at least partially closing the top body portion of the clamp toward the elongated element; and inserting the ratchet into the opening until the rounded inner surfaces of the top body portion and the bottom body portion are secured against the elongated element, wherein the ratchet has a plurality of teeth, and the retaining assembly engages a portion of the plurality of teeth in the opening, the ratchet being releasable from the retaining assembly without tools, wherein the retaining assembly includes a first retainer having a pawl configured to removably engage at least one of the plurality teeth on a first edge of the ratchet and a second retainer having a pawl configured to removably engage at least one of the plurality teeth on a second edge of the ratchet opposite the first edge, wherein each of the first and second retainers is formed integrally with the bottom body portion, wherein each of the first and second retainers includes a button, and a center portion fixed in the bottom body portion and positioned vertically between the pawl and the button, the pawl and the button being rotatable about the center portion, and wherein the pawl of a respective first or second retainer being selectively disengaged by pressing the button of the respective first or second retainer inward at least partially into an interior of the bottom body portion causing the pawl to at least partially retract from the interior.

12. The method of claim 11, further comprising a step of:

releasing the ratchet from retaining assembly by simultaneously pressing each of the first and second retainers to release the respective pawls.

* * * * *